July 21, 1959   L. E. SCHRADER   2,895,240
EMERGENCY RELEASE MECHANISM
Filed Feb. 17, 1958   2 Sheets-Sheet 1
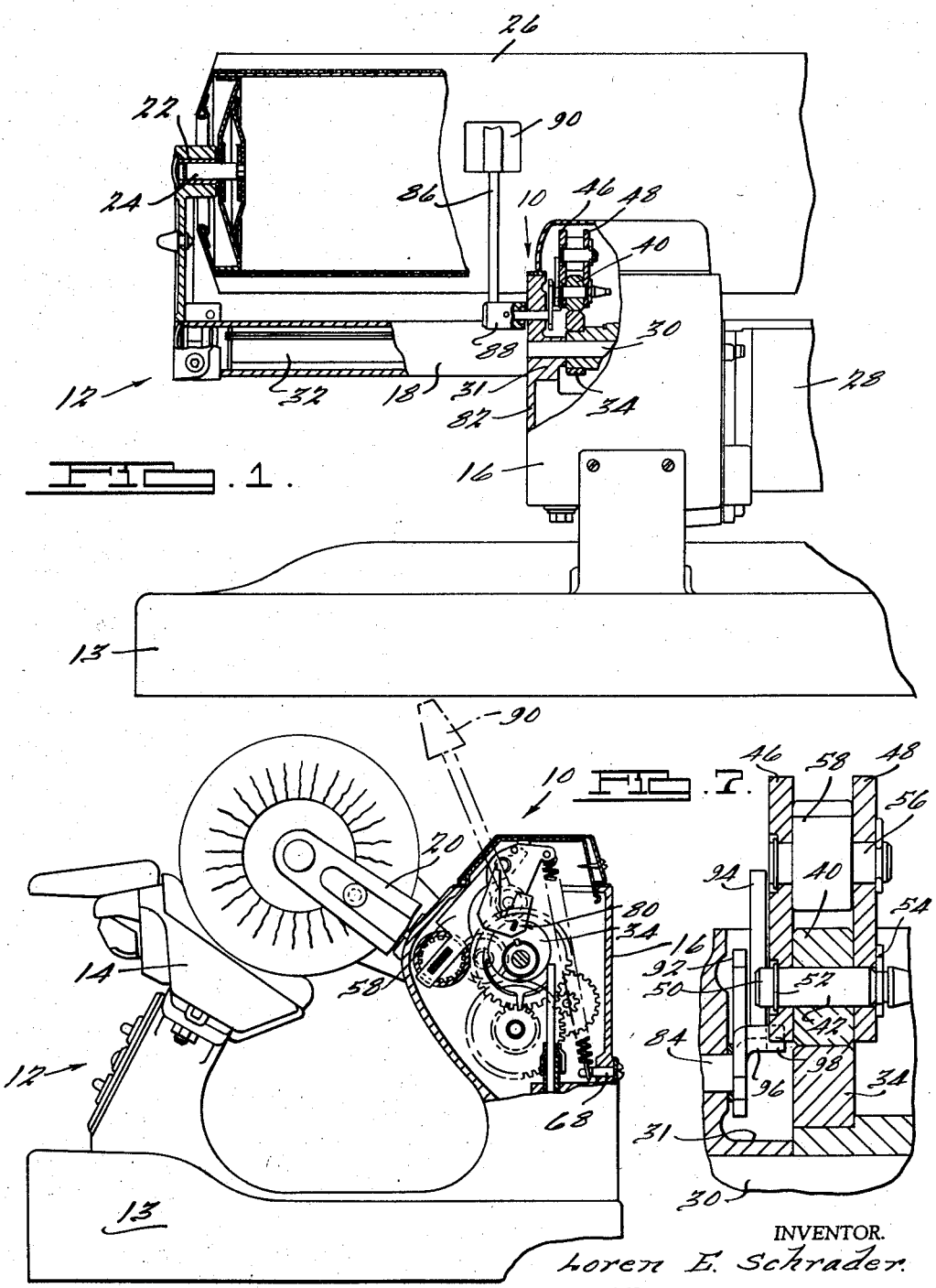
INVENTOR.
Loren E. Schrader.
BY
Harness, Dickey & Pierce,
ATTORNEYS.

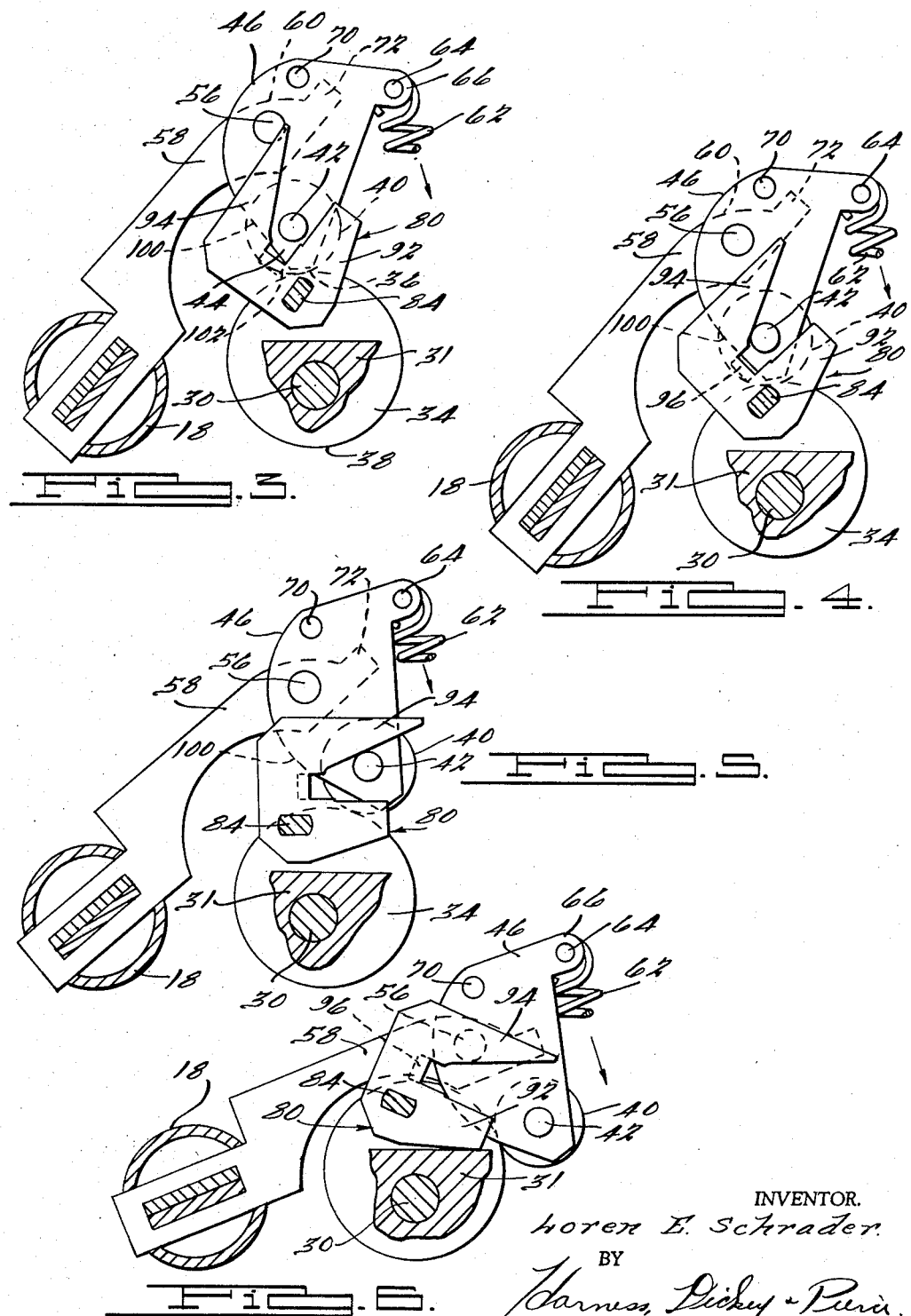

United States Patent Office 2,895,240
Patented July 21, 1959

2,895,240

EMERGENCY RELEASE MECHANISM

Loren E. Schrader, Mount Clemens, Mich., assignor to Ironrite, Inc., Mount Clemens, Mich., a corporation of Michigan Application February 17, 1958, Serial No. 715,737

4 Claims. (Cl. 38—59)

This invention relates generally to ironing machines and more particularly to an emergency release mechanism for an ironing machine.

Ironing machines are commonly provided with a roll release mechanism which provides for manual movement of the ironer roll in a direction away from a stationary shoe against which the roll is positioned during ironing or pressing. An example of such a release mechanism is the one shown in Patent No. 2,648,147 owned by the assignee of this invention. Such a release mechanism is provided for safety purposes and also for the purpose of preventing burning of the article being ironed in the event of a power failure preventing automatic separation of the roll and shoe. To be effective, such a release mechanism must be readily operable with a minimum of manual force and must not interfere with a return movement of the roll to a position against the shoe when operation of the ironer is to be resumed.

It is an object of this invention, therefore, to provide an improved emergency release mechanism which is readily operable manually with a minimum of force.

A further object of this invention is to provide an emergency roll release mechanism for an ironing machine which is simple and rugged in construction, economical to manufacture, and efficient in operation in providing a desired quick and easy movement of the roll away from the shoe during a prolonged service life of the machine.

Further objects, features and advantages of this invention will become apparent from a consideration of the following description, the appended claims and the accompanying drawing in which:

Figure 1 is a fragmentary rear elevational view of an ironing machine provided with the emergency release mechanism of this invention, with some parts broken away and other parts shown in section for the purpose of clarity;

Fig. 2 is a side elevational view of the ironing machine and emergency release mechanism assembly shown in Fig. 1, with some parts broken away and the other parts shown in section for the purpose of clarity;

Figs. 3, 4, 5 and 6 are enlarged elevational views of a portion of the ironing machine shown in Figs. 1 and 2, illustrating progressively moved positions of the emergency release mechanism of this invention during operation of the mechanism to separate the roll from the shoe; and Fig. 7 is an enlarged view of a portion of the release mechanism shown in Fig. 1.

With reference to the drawing, the emergency release mechanism of this invention, indicated generally at 10, is illustrated in Figs. 1 and 2 in assembly relation with an ironing machine 12 of usual type. The machine 12 includes a main frame 13, only the table portion of which is illustrated, and a stationary shoe 14 provided with internal heating elements (not shown). A gear housing 16, arranged centrally on the frame 13 and secured thereto so as to constitute a part of the frame 13, rotatably supports a shaft or tube 18 extended lengthwise of the frame 13. At its ends, the tube 18 carries a pair of upwardly and forwardly inclined arms 20, only one of which is shown, each of which is provided at its upper end with a bearing 22 that rotatably supports a stub shaft 24 on an ironing roll 26 which extends longitudinally of the frame 13 in a substantially parallel relation with the supporting tube 18.

An electric motor 28 (Fig. 1) on one side of the gear housing 16 drives a cam 34 which is rotatably supported on a shaft 30 that is journaled in portions of the housing 16 including a boss 31. The motor 28 also drives a shaft (not shown) in the tube 18 and a plurality of gears (not shown) to drive a stub shaft 24 for rotating the roll 26. A pair of flat torsion springs 32 in the tube 18 transmit pressure to the roll arms 20.

A gear and clutch mechanism (not shown) in the housing 16 provides for a controllable "on" and "off" drive of the cam 34 on the shaft 30. As shown in Figs. 3 to 6, inclusive, the cam 34 has a "high" side 36 and a "low" side 38 located diametrically opposite the "high" side 36. A follower 40 located in the plane of and above the cam 34 is rotatably supported on a short pin member 42 supported on and extending between the lower ends 44 of a pair of parallel spaced plate members 46 and 48 of identical construction.

As shown in Fig. 7, the pin 42 has an end portion 50 which extends outwardly of the outer side of the adjacent plate member 46. A retainer ring 52 and a wire clamping member 54 disposed in corresponding grooves in the pin member 42 at the outer sides of the plates 46 and 48 maintain the pin 42 in a position in which the end portion 50 thereof projects outwardly of the outer side of the plate member 46.

A second pin member 56 is connected to and extends between the plates 46 and 48 at a position above the pin 42 at a location between the ends of the plates. An arm member 58 (Figs. 2 to 6) extends between the plates 46 and 48 and is supported adjacent its upper end 60 on the pin 56. At its lower end, the arm 58 extends through and is secured to the tube 18 for rotation therewith.

A spring 62 connected at its upper end to a pin 64 carried on the plates 46 and 48 at the upper ends 66 thereof is connected at its lower end to a pin 68 on the gear housing 16. The spring 62 thus acts during normal operation of the ironing machine 12 to maintain the pin 42 in a position in which it is to the left, as viewed in Figs. 2 and 3, of a line extending between the pin 64 and the shaft 30. Engagement of a stop pin 70 carried by the plates 46 and 48 with an ear 72 on the upper end 60 of the arm 58 prevents movement of the pin 42 further to the left as viewed in Figs. 2 and 3. During rotation of the cam member 34, therefore, the spring 62 maintains the follower member 40 in rolling engagement with the cam member 34.

When the cam member 34 is rotated to a position in which the high side 36 thereof is in engagement with the follower 40, the arm member 58 is in its uppermost position, thereby maintaining the roll-supporting arms 20 in their lowermost positions in which the roll 26 is firmly held against the stationary ironing shoe 14. When the cam member 34 is rotated one hundred and eighty degrees to a position in which the low side 38 thereof is in engagement with the follower member 40, the spring 62 has maintained the follower in engagement with the cam 34 so that the arm member 58 has been moved downwardly to its lowermost position to thereby move the roll-supporting arms 20 upwardly, about the tube 18, to their uppermost positions in which the roll 26 is spaced from the shoe 14.

In a normal ironing and pressing use of the machine 12, the roll 26 is spaced about one-fourth to three-fourths of an inch from the shoe 14, in its position spaced above the shoe, which spacing is well adapted for ordinary ironing and pressing purposes. The emergency release mechanism 10 is provided for quickly moving the roll 26 away from the shoe 14 an amount necessary to provide for a complete release of an article being ironed to prevent burning of that article in the event of a power failure when the cam 34 is in or near a position in which the high side 36 thereof is in engagement with the follower 40. A separation of about two inches has been found to be completely satisfactory for such emergency conditions.

The emergency release mechanism 10 includes an irregularly shaped lever member 80 which is positioned between the follower-supporting plate 46 and the adjacent side wall 82 of the gear housing 16. The lever member 80 is secured to one end of a shaft 84 rotatably supported in the housing wall 82 above the boss 31. An arm 86 is secured at its lower end to a hub 88 which is in turn connected to the shaft 84 so that a swinging movement of the arm 86 effects a rotation of the shaft 84. A handle member 90 mounted on the upper end of the arm 86 is shaped so that it is readily operable with the palm of the hand to swing the arm 86 in a clockwise direction as viewed in Fig. 2 to effect a separation of the roll 26 and the shoe 14.

The lever member 80, which is shaped so that it may be economically formed by stamping, includes a pair of spaced leg portions 92 and 94 and an integral laterally extending flange 96 located generally between the connected ends of the legs 92 and 94. The flange 96 is of a length such that a terminal end portion 98 of the flange is engageable with an adjacent side edge 100 of the plate member 46 on rotation of the lever member 80 in a clockwise direction as viewed in Fig. 3. The leg portion 94 is offset from the leg portion 92 in a direction toward the adjacent plate member 46 a distance such that the leg member 94 is engageable with the end portion 50 of the pin 42, when the lever member 80 is rotated in a clockwise direction as viewed in Fig. 3 and the leg portion 92 is positioned so that it is spaced outwardly from the pin portion 50.

In the operation of the emergency release mechanism 10, assume that the power for the ironer 12 has failed at a time when the high side 36 of the cam 34 is in engagement with the follower member 40 so that the roll 26 is against the shoe 14. The emergency release operating handle 90 is in the "re-set" position illustrated in Fig. 2 in which one side edge 102 of the lever flange 96 is adjacent the side edge 100 of the plate 46. Accordingly, on initial rotation of the arm member 86 in response to palm pressure of the operator on the handle 90, the flange side edge 102 is swung upwardly and rearwardly about the shaft 84 to swing the plates 46 and 48 counterclockwise about their supporting pin 56. An initially moved position of the release mechanism 10 is illustrated in Fig. 3.

On further actuation of the handle 90 to move the lever member 80 in a clockwise direction as viewed in Fig. 4, the flange 96 is moved to a position in which it is substantially parallel to the side edge 100 of the plate 46. At such time, the leg portion 94 of the lever member 80 engages the adjacent side of the pin end portion 50 so as to continue counterclockwise rotation of the plate members 46 and 48 in response to clockwise rotation of the lever member 80. Such movement of the plate members 46 and 48 is against the pressure of the spring 62 and acts to move the follower 40 along the cam 34 in a direction toward the low side 38 thereof as shown in Fig. 5. Once the pin 42 has been moved to a position to the right of a line extending between the pin 64 and the shaft 30, the pressure of the spring 62 assists in moving the follower 40 off the high side 36 of the cam 30 and toward the low side 38 thereof. Such movement of the cam follower 40 provides for a downward movement of the plate member pin 56 which supports the arm 58. Consequently, the arm 58 is movable in a downward direction along with the cam follower 40 to effect a corresponding upward movement of the roll-supporting arms 20 to separate the roll 26 from the shoe 14. A fully moved position of the arm 58 is illustrated in Fig. 6 in which the upper end thereof engages the cam 34. In this position the spring 62 has moved the follower 40 and the plates 46 and 48 ahead of the actuating leg 94 of the lever 80.

The lever leg 92 engages the top of the housing boss 31 as shown in Fig. 6 to limit movement of the lever 80 to a position in which it is readily returnable to a position corresponding to the "re-set" position of the arm 86 shown in Fig. 2.

The flange member 96 is located as close as possible to the shaft 84 so as to provide for an initial application of a maximum force to the plate 46 tending to move the follower 40 off the high side of the cam 34. Once the flange 96 has been moved to a position in which further transfer of force from the lever 80 to the plate 46 moving the follower 40 along the cam 34 will not be accomplished efficiently by way of the flange 96, the point of transfer of force from the lever member 80 to the follower member 40 takes place at the lever leg portion 94 and the pin 42. Consequently, a maximum portion of the force applied to the handle 90 is used to effect movement of the follower 40 along the cam member 34 in a direction to release the roll 26. As a result, only a small force, well within accepted safety standards, is necessary at the handle 90 to provide for the separation of the roll 26 and the shoe 14.

In order to move the handle 90 from its release position (not shown) corresponding to a position of the lever 80 shown in Fig. 6, in a counterclockwise direction to its "re-set" position illustrated in Fig. 2, the operator manually grasps the roll-supporting arms 20 and swings the arms downwardly to move the roll against the shoe and to swing the arm 58 upwardly. The arm 58 swings the plate members 46 and 48 upwardly to the position illustrated in Fig. 3. During such upward movement, the pin end portion 50 engages the leg portion 94 of the lever 80 to effect movement of the lever 80 to the position illustrated in Fig. 2. In such position, the lever 80 does not interfere with movement of the follower 40 during normal operation of the machine 12.

It will be understood that the specific construction of the improved emergency release mechanism which is herein disclosed and described is presented for purposes of explanation and illustration and is not intended to indicate limits of the invention, the scope of which is defined by the following claims.

What is claimed is:

1. In an ironing machine which includes a frame, an ironing shoe on the frame, a shaft rotatably mounted on the frame, a roll carried on the shaft, an arm attached to and extending transversely of the shaft, a plate member pivotally connected to said arm, a pin on said plate member, a cam follower rotatably supported on said pin, and a cam member rotatably supported on said frame and arranged in rolling engagement with the follower so that on rotation of the cam member the follower and the arm are moved so as to rotate said shaft and swing the roll back and forth toward and away from the shoe; an emergency release mechanism for moving the roll away from the shoe when the cam member is in a stationary position corresponding to a position of the roll against the shoe, said mechanism comprising an irregularly shaped lever member pivotally mounted on the frame adjacent said follower supporting plate member for rotation about an axis substantially perpendicular thereto, and leg means on said lever member engageable with said follower supporting pin for moving the plate member in a direction to move said follower along said cam member and thereby move said arm in a direction to move the roll away from the shoe.

2. In an ironing machine which includes a frame, a horizontal ironing shoe, a horizontal roll movable up and down between positions in contact with and spaced above said shoe, an upright cam member mounted on said frame for rotation about a horizontal axis and having a high side and a low side, a cam follower positioned above said cam member, a pin for rotatably supporting said follower, vertically disposed supporting plate means for said pin, spring means connected to and extending between the plate means and said frame for normally maintaining the follower in rolling engagement with the top side edge of the cam member, and arm and shaft means connected to and extending between said plate means and said roll so that when the cam member is in a position such that the low side thereof is in engagement with the follower the roll is spaced above the shoe and when the cam member is in a position such that the high side thereof is in engagement with the follower the roll is in contact with the shoe; an emergency release mechanism for moving the roll upwardly to a position above the shoe when the follower is resting on the high side of the cam member comprising a lever pivotally supported on the frame for rotation about an axis substantially parallel to said pin, said lever having a first portion located adjacent said axis and adjacent a lower side edge of said plate means for initial engagement therewith on swinging movement of the lever in one direction for moving said plate means in a direction to move said follower along said cam member toward the low side thereof, said lever having a second portion spaced further from said axis than said first portion and engageable with said pin on continued swinging movement of the lever in said one direction for continuing movement of said follower toward said cam member low side.

3. In an ironing machine which includes a frame, an ironing shoe on the frame, a shaft rotatably mounted on the frame, a roll carried on the shaft, an arm attached to and extending transversely of the shaft, a plate member pivotally connected to said arm, a pin on said plate member, a cam follower rotatably supported on said pin, and a cam member rotatably supported on said frame and arranged in rolling engagement with the follower so that on rotation of the cam member the follower and the arm are moved so as to rotate said shaft and swing the roll back and forth toward and away from the shoe; an emergency release mechanism for moving the roll away from the shoe when the cam member is in a stationary position corresponding to a position of the roll against the shoe, said mechanism comprising an irregularly shaped lever member pivotally mounted on the frame adjacent said follower supporting plate member for rotation about an axis substantially perpendicular thereto, laterally extending flange means on said lever member located in a closely spaced relation with said axis and engageable with one side edge of said plate member on initial rotation of the lever member for moving the plate member in a direction to move said follower along said cam member and thereby move said arm in a direction to move the roll away from the shoe, leg means on the lever member engageable with said pin on continued rotation of the lever member, and manually operable handle means connected to the lever member.

4. In an ironing machine which includes a frame, a horizontal ironing shoe, a horizontal roll movable up and down between positions in contact with and spaced above said shoe, an upright cam member mounted on said frame for rotation about a horizontal axis and having a high side and a low side, a cam follower positioned above said cam member, a pin for rotatably supporting said follower, vertically disposed supporting plate means for said pin, spring means connected to and extending between the plate means and said frame for normally maintaining the follower in rolling engagement with the top side edge of the cam member, and arm and shaft means connected to and extending between said plate means and said roll so that when the cam member is in a position such that the low side thereof is in engagement with the follower the roll is spaced above the shoe and when the cam member is in a position such that the high side thereof is in engagement with the follower the roll is in contact with the shoe; an emergency release mechanism for moving the roll upwardly to a position above the shoe when the follower is resting on the high side of the cam member comprising a lever pivotally supported on the frame for rotation about an axis substantially parallel to said pin, said lever being formed with an integral laterally extending flange located adjacent said axis and adjacent a lower side edge of said plate means for initial engagement therewith on swinging movement of the lever in one direction for moving said plate means in a direction to move said follower along said cam member toward the low side thereof, said lever having a leg portion spaced further from said axis than said flange and engageable with said pin on continued swinging movement of the lever in said one direction for continuing movement of said follower toward said cam low side.

References Cited in the file of this patent
UNITED STATES PATENTS

| 2,538,617 | Davis et al. | Jan. 16, 1951 |
| 2,648,147 | Sperlich | Aug. 11, 1953 |